(12) United States Patent
Rosefsky

(10) Patent No.: US 6,357,998 B1
(45) Date of Patent: Mar. 19, 2002

(54) RIBBON DRIVE PUMPING APPARATUS AND METHOD

(76) Inventor: Jonathan B. Rosefsky, 251 W. Montgomery Ave., Haverford, PA (US) 19041

( * ) Notice: Subject to any disclaimer, the term of this patent is extended or adjusted under 35 U.S.C. 154(b) by 0 days.

(21) Appl. No.: 09/628,787

(22) Filed: Jul. 29, 2000

Related U.S. Application Data

(60) Provisional application No. 60/146,122, filed on Jul. 29, 1999.

(51) Int. Cl.[7] .............................................. F04D 25/16
(52) U.S. Cl. ............................. 415/66; 415/72; 415/75; 415/131; 416/176
(58) Field of Search .............................. 415/66, 71, 72, 415/73, 75, 129, 130, 131, 908, 128, 176, 177

(56) References Cited

U.S. PATENT DOCUMENTS

| | | | |
|---|---|---|---|
| 119,155 A | 9/1871 | Kolb | |
| 475,826 A | 5/1892 | Street | |
| 1,549,608 A | 8/1925 | Raynes | |
| 2,568,903 A | 9/1951 | Vassar | 115/34 |
| 2,656,809 A | 10/1953 | Frasure | 114/151 |
| 3,070,061 A | 12/1962 | Rightmyer | 115/34 |
| 3,141,439 A | 7/1964 | Liston | 115/16 |
| 3,299,821 A | 1/1967 | Silvern | |
| 3,441,088 A * | 4/1969 | Levy | 415/74 |
| 3,482,402 A | 12/1969 | Anthoney, Sr. | 60/221 |
| 3,737,249 A | 6/1973 | Cooper | 416/179 |
| 3,796,508 A | 3/1974 | Rowley | 415/72 |
| 3,976,453 A * | 8/1976 | Brown | 55/222 |
| 4,373,919 A | 2/1983 | Stangeland | 440/47 |
| 4,426,190 A * | 1/1984 | Shapiro et al. | 415/74 |
| 4,496,282 A * | 1/1985 | Gokhman | 415/161 |
| 4,634,389 A | 1/1987 | Eptaminitakis | 440/53 |
| 5,181,868 A | 1/1993 | Gabriel | 440/38 |
| 5,240,374 A | 8/1993 | Speer | 416/140 |
| 5,244,425 A | 9/1993 | Tasaki et al. | 440/47 |
| 5,292,270 A | 3/1994 | Tucker et al. | 440/82 |
| 5,324,216 A | 6/1994 | Toyohara et al. | 440/47 |
| 5,383,802 A | 1/1995 | Nicholson | 440/38 |
| 5,417,597 A | 5/1995 | Levedahl | 440/6 |
| 5,558,509 A | 9/1996 | Jirnov et al. | 415/15 |
| 6,013,140 A * | 1/2000 | Simoneaux | 148/320 |

FOREIGN PATENT DOCUMENTS

| | | |
|---|---|---|
| DE | 298 12 429 | 7/1999 |
| EP | 0 480 501 A1 | 9/1991 |
| FR | 467393 | 2/1947 |
| FR | 2 749 558 | 12/1997 |
| JP | 5-294282 | 5/1993 |
| JP | 6-191482 | 6/1994 |
| WO | WO 87/01353 | 12/1987 |
| WO | WO 95/23088 | 8/1995 |

* cited by examiner

*Primary Examiner*—Edward K. Look
*Assistant Examiner*—Ninh Nguyen
(74) *Attorney, Agent, or Firm*—Roberts Abokhair & Mardula, LLC

(57) ABSTRACT

A ribbon drive pumping apparatus and method for liquids is disclosed. The pump has an extended tube having an intake at a first end and an outlet at a second end. A ribbon formed of helical coils is mounted in the tube for rotation and the frequency of the coils decreases from the first end to the second end of the tube. Liquid is collected at the first end, an axial component of velocity of the liquid is increased via the rotating ribbon, and the liquid is ejected from the second end to provide pumping of the liquid. A central opening helps decrease cavitation.

20 Claims, 4 Drawing Sheets

RIBBON DRIVE PUMPING APPARATUS AND METHOD

RELATIONSHIP TO PRIOR APPLICATIONS

This application claims the benefit of U.S. Provisional Application No. 60/146,122, filed Jul. 29, 1999.

FIELD OF THE INVENTION

This invention relates generally to an apparatus for pumping water or other fluids using a ribbon drive mechanism. More particularly, the present invention is a ribbon drive shaped as a spiral ribbon along the interior wall of a tubular conduit for causing water or other fluids to be pumped through the apparatus.

BACKGROUND OF THE INVENTION

The United States and other countries are facing an ever increasing spiral of demands for electric power. Coal powered electric power generation facilities, while relatively cost-effective, nevertheless present a number of adverse environmental issues from an air and water standpoint as well as from a mining standpoint. Nuclear powered electric power generation facilities, while capable of producing significant amounts of electric power, are extremely expensive to build and to operate and represent, to many communities, the ever present danger of a Three Mile Island/Chernobyl type nuclear catastrophe with all of its associated environmental hazards and life-threatening situations. Solar power electric generation facilities, while promising from an environmental impact standpoint, are unlikely to be able to generate significant portions of the vast amounts of power needed presently and in the future given the current state of this particular technology. Hydropower generation offers one of the more promising power generation opportunities through its use of a renewable resource. However, current hydropower generation techniques involve: the expenditure of vast amounts of capital to construct large dams; the flooding and rendering unusable of large areas of land to contain the vast amounts of water required for this type of power generation. In addition, insufficient water depth, water volume, and speed of water flow are factors that significantly limit the areas in which current hydropower generation can be employed. With these limitations in mind, there are numerous areas of the country and of the world that have water resources that could be used to generate hydropower in large amounts if these impediments could be overcome.

One method of overcoming these impediments is to pump water from low areas to higher areas of elevation to allow water to be concentrated in a series of relatively small reservoirs and to allow the energy of falling water to be harnessed for hydropower generation purposes. This type of system would be particularly advantageous for providing peak shaving of electrical loads. A significant volume of water would need to be moved uphill for this objective to be accomplished. Clearly, there is an acute need for the development of a more effective and energy efficient pumping apparatus that will support employment of hydropower generation facilities in areas previously considered not viable for this type of effort.

Rotary or screw pumps have long been the subject of various inventions. For example U.S. Pat. No. Re 29,626 was issued to Allen for a positive displacement rotary pump and drive coupling therefor. The pump was comprised of a progressing cavity, positive displacement rotary pump assembly for fluid or semi-fluid material. The assembly included a rotary shaft with an associated drive motor and pump components including a tubular stator with interior helical surface and an orbital rotor within the stator operably connected to the shaft and having an exterior helical surface. The rotor was coupled to the shaft by a flexible torque tube with one end connected to the shaft by a flexible torque tube and the other connected to an end of the rotor to transmit driving torque to the rotor. However, there was no multiplication of the velocity of the water since the frequency of the blades remained constant throughout the length of the containment tube.

U.S. Pat. No. 4,857,046 was issued to Stevens et al. for a drive catheter having helical pump drive shaft. The catheter included an outer sheath and a rotatable core coupled to a distal tip that directly contacted deposits on the inside of blood vessel inner walls. An outer surface of the rotatable core defined a screw pump for moving dislodged deposits away from the blood vessel through the catheter sheath to a bifurcating adapter located outside the patient. However, there was no multiplication of the velocity of the fluid since the frequency of the blades remained constant throughout the length of the containment tube.

U.S. Pat. No. 5,923,376 was issued to Wright for a Moineau pump with rotating closed end outer member and nonrotating hollow inner member. The pump consisted of a progressive cavity pump with a helical gear pair, wherein the closed end outer gear rotated and orbited relative to a nonrotating hollow inner gear. A hollow inner gear comprising an internal chamber extending axially allowed the flow of pumpable material from progressing cavities to the closed end and through the hollow inner gear. The pump could be used within a material containment vessel, and the invention could be positioned to avoid contact of the pumpable material with any rotating couplings. However, as with the inventions discussed above, there was no multiplication of the velocity of the fluid since the frequency of the blades remained constant throughout the length of the containment tube U.S. Pat. No. 5,674,063 was issued to Ozaki et al for a screw fluid machine and screw gear used in the same. The screw fluid machine consisted of male and female rotors which were engaged with each other, a casing for accommodating both rotors, fluid working rooms formed by the rotors and the casing, and fluid inlet and outlet ports which were provided in the casing so as to intercommunicate with one end portion and the other portion of the working rooms. The helix angle of the screw gear constituting each of the male and female rotors was set to be continuously varied in a helix advance direction. Although this arrangement did pump fluid there was no multiplication of the velocity of the fluid since the frequency of the helix remained constant throughout the length of the casing.

U.S. Pat. No. 5,961,212 was issued to Haegeman for a screw with continuous and discontinuous blades for water processing apparatus. The apparatus comprised a power source driving a shaft supporting a helicoidal, spiral-shaped screw having an upper end part and fitted round at least part of the shaft, such that water was sucked up or impelled downwards, the screw comprising at least one continuous screw blade and at least one discontinuous screw blade near at least one of its end parts. Although the blades were a combination of continuous and discontinuous construction, there was no multiplication of the velocity of the fluid since the frequency of the two blades remained constant throughout the length of the apparatus.

While these various systems represent inventive approaches to the pumping of fluids, they do not overcome the limitations and impediments currently found in hydropower generation efforts, namely: the requirement for expenditure of vast amounts of capital to construct large dams; the flooding and rendering unusable of large areas of land to contain the vast amounts of water required for this type of power generation; and the restriction of power generation facilities to those areas having sufficient water depth, water volume, and speed of water flow to support hydropower generation using currently available technologies.

Therefore, what would be useful would be a pumping system capable of overcoming these limitations and allowing hydropower generation at a lower cost of facilities construction, with less loss of land due to the flooding required, and able to operate in areas previously considered unsuitable for hydropower generation due to insufficient water depth, insufficient water volume, and/or insufficient speed of water flow.

The present invention is just such a system that differs significantly from the inventions discussed above. The present invention generally comprises a ribbon drive attached to the interior periphery of a spinning containment tube or a series of peripheral rings with a high frequency coil at the intake end at point A with the frequency decreasing along the length of the tube to point B.

SUMMARY OF THE INVENTION

As discussed more fully below, the ribbon drive pumping apparatus consists of a ribbon-like curved shape, composed of metal or other suitable material, attached to the interior periphery of a spinning containment tube or a series of peripheral rings having a constant diameter for the length of the containment tube.

It is an object of the present invention to create a pumping apparatus for a hydropower generation system that involves significantly decreased outlays of capital for facilities construction compared to that presently required.

It is a further object of the present invention to create a pumping apparatus for a hydropower generation system that requires a significantly less volume of water for operation than that required by current technologies thereby resulting in decreased flooding and rendering unusable large areas of land to contain the vast amounts of water required for current technologies to operate.

It is a further object of the present invention to create a pumping apparatus that will allow a hydropower generation system to function in areas where water depth, water volume, and/or speed of water flow are insufficient to support current technology hydropower generation systems.

It is yet another object of the present invention to provide a system and method useful for enabling hydropower peak shaving of electrical power needs.

It is another object of the present invention to provide a pump system having a reduced tendency to cause cavitation in the pumped liquid.

The ribbon drive pumping apparatus consists of a ribbon-like curved shape, composed of metal or other suitable material, attached to the interior periphery of a spinning containment tube or a series of peripheral rings having a constant diameter for the length of the containment tube.

A key element of the present invention is that there is a change in the frequency of curves of the ribbon drive, which proceeds from a high frequency (many coils per unit length) at the leading portion of the apparatus to a low frequency (few coils per unit length) at the trailing portion of the apparatus. The apparatus has an increasingly stretched frequency of coils as one proceeds down the length of the interior periphery of the containment tube. For example, in appearance, at the intake point for the water at point A, the apparatus would present a tightly curved angle for the coil, with said angle being nearly vertical to the intake of water passing through the apparatus and changing/progressing to a much more gradual curve at an angle that might approximate 30 degrees to the horizontal at the discharge point of the containment tube at Point B.

The initial tight curves (the high frequency front entry section of the coil) provide an initial velocity of the water into and within the forward portion of the containment tube. As the rate of curve, i.e., the number of coils per unit length, decreases with the coils already rotating, the velocity of the water increases incrementally as it is driven back towards the rear portion of the ribbon drive and toward the output at Point B of the containment tube. The entire ribbon drive is constructed within a containment tube in order to accommodate the increased water or fluid velocity which is imparted to the water or other fluid as it moves from the front to the rear of the tube and to give that water or other fluid a more pronounced rearward direction as well as to prevent loss of energy to the sides as would be the case with a typical open propeller type design.

DETAILED DESCRIPTION OF THE INVENTION

Figure 1A:
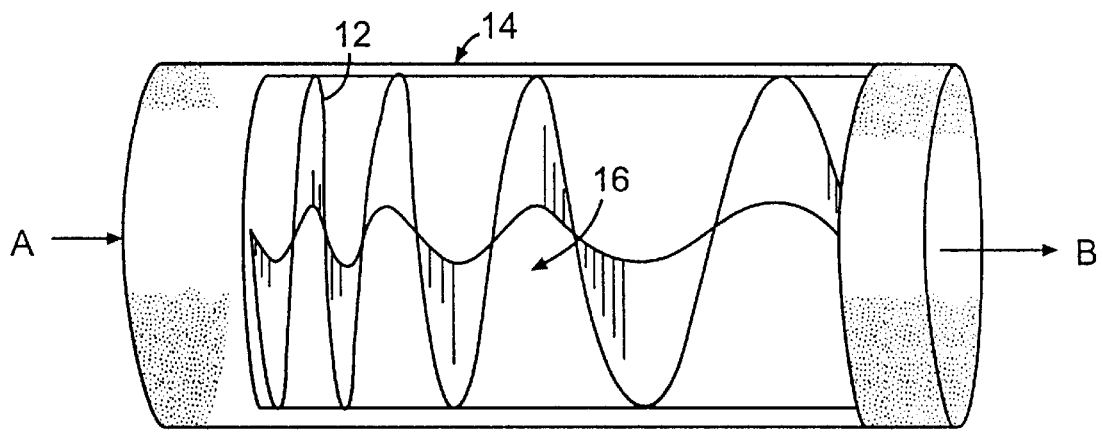
FIGS. 1A–B illustrate the peripheral design of the pump apparatus.
Figure 1B:
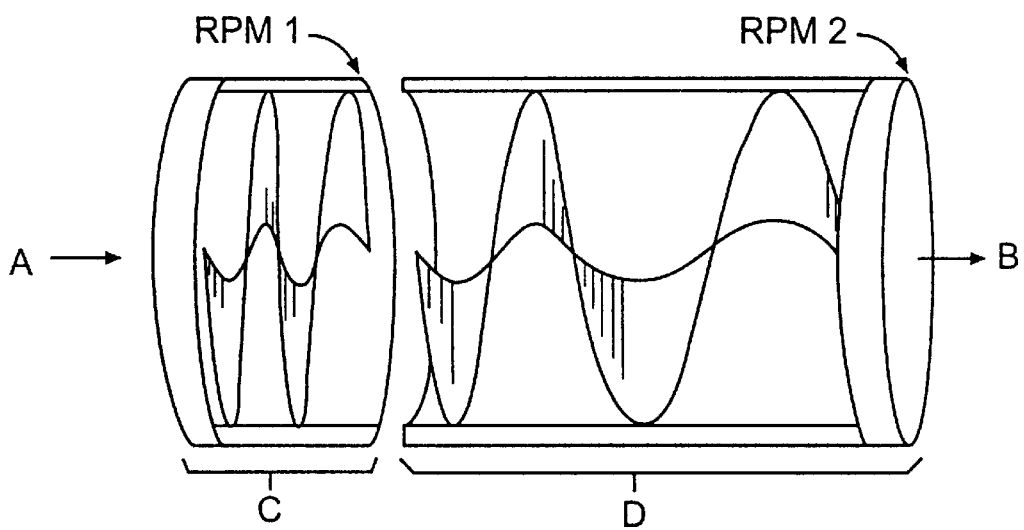

Referring to FIG. 1A, the peripheral design is illustrated. The ribbon drive pumping apparatus consists of a ribbon-like curved shape vane, composed of metal or other suitable material 12, attached to the interior periphery of a spinning containment tube 14 or a series of peripheral rings having a constant diameter for the length of the containment tube. Water or other fluid flows through the pumping apparatus in the direction of the arrow as the entire containment tube rotates or spins, thus turning the attached ribbon drive vane. The containment tube with attached vane can be divided into 2 or more sections C, D, as illustrated in FIG. 1B, each being rotated at different rates optimized for final fluid output volume and velocity.

Water or other fluid initially enters the containment tube at point A and initially is propelled down the tube up to a speed limited by virtue of the high frequency of the coil section located at the leading edge portion of the containment tube. However, to accept each initial unit volume of water which has been sped up by the initial high frequency coil, the frequency of the subsequent coil and the associated helix angle of the ribbon/vane decreases, thereby imparting additional velocity to the water as it exits from the tube at point B.

The ribbon drive method/process becomes clearer when considering that if an accelerated unit volume of water were moving at, e.g., 10 feet/second, and contacted a subsequent coil of the same frequency/angle/tightness of curve, that coil would act to inhibit the flow of accelerated water unless that subsequent coil were turning at an even higher number of revolutions per minute to accommodate the increased velocity imparted to exiting water by the preceding coil. However, being within the same spinning containment tube turning at the same rate, e.g., 400 RPM, the second coil cannot rotate at a higher RPM. On the other hand, if the second coil has a lower frequency than the first coil, it will transfer additional energy to the already accelerated unit volume of water, resulting in an exit velocity after the second coil of, say, 12 or 14 feet/second. Thus the frequency/angle/tightness of curve of the subsequent sections decreases, thereby imparting additional velocity to the water as it exits from the tube at point B.

The frequency of each coil and the distance between the coils can be optimized by design, whether fixed in the same containment tube or not. If subsequent coils of lower frequency are rotated in separate sections at separate RPM's, additional energy savings and increases in velocity and volume can be attained by allowing the rotation rates of subsequent sections to be tailored for optimum or maximum performance.

Within the containment tube, the central core 16 is open to water flow from the entry point. This unobstructed central flow of water accommodates the need for additional water to fill the virtual space vacated by water (thought of a unit volume for demonstration purposes which has been sequentially accelerated rearward.

The essential element of design of the present invention is the ribbon drive whose curve changes from a high frequency of coils per unit length to a low frequency of coils per unit length as one moves or progresses from the intake end to the output end of the containment tube. From an appearance standpoint, the ribbon drive would, at the intake point A of the apparatus, be comprised of a series of tight curves of the ribbon drive having an angle very nearly close to vertical at the intake point of the containment tube with a gradual curve as one progresses from the intake end to the output end or discharge point of the containment tube with an angle at the output end of the containment tube that might approximate 30 degrees.

The tight helix of the ribbon drive, i.e., high frequency of coils per unit length, initially brings water or other fluid into the containment tube. As the accelerated water or other fluid proceeds to the lower frequency curve of the already spinning helix, the water velocity speeds up sequentially.

Assume that a fluid, such as water, is moving along at a rate of speed "a." Initial energy is imparted to water moving along the central linear axis of the ribbon drive by a high frequency coil. The amount of energy depends upon the revolutions per minute (R.P.M.) of the central linear shaft and thus of each coil of the helical shape. A unit of water, upon exiting coil HF#1 (high frequency, 1st coil), is moving at velocity "a+1. " If a second, identical subsequent coil HF#2 is turning at the same rate as HF#1, then it, too, can only add "1" to initial velocity "a"—not "1" to "a+1"—because HF#2 and HF#1 would be rotating at the same speed. Further, having the same helix angle at HF#2 would even act to impede the rapid passage of water moving at "a+1" having exited from HF#1, rather than to facilitate the water passage with a less steep helix angle. Increasing the frequency of HF-#2 (making it a tighter coil, with a steeper helix angle) would make it act more like a wall than a water conduit, while rotating on the same shaft as HF#1.

Therefore, the coil at an HF#2 position, rotating on the same shaft and at the same RPM as HF#1, must be a coil of lower frequency than HF#1, said second coil now called MF#1 ($1^{st}$ middle frequency coil).

A unit of energy initiated at the front edge of HF#1, by the rotation of the ribbon drive, is transferred to move water along the edge of its relatively vertical ribbon-like band/vane, with a small net increase in the axial velocity. The unit of energy next reaches MF#1 coil, moving along the edge of the more spread-out coil of the vane, traveling a greater distance along the edge of the vane in MF#1 compared to HF#1 per rotation. Therefore the unit of energy travels faster axially since a 360 degree curve of the MF#1 coil is more spaced out, stretched out as it were, along the central axle.

The unit of energy is imparted to unit volumes of water (for discussion purposes) moving rearward through the ribbon drive. The energy is applied at a constant rate (all coils turning at the same RPM) but along a constantly longer path. That longer path accommodates the unit of water moving at "a+1" because the vane face is less vertical than at HF#1, the vane edge is less vertical/more horizontal in MF#1 (the second coil in a ribbon drive propulsion system), with the unit of energy moving faster axially. Similar reasoning applies to the subsequent low frequency curve LF#1, the final curve or coil in a 3-coil setup.

Considering a unit volume of water exiting from HF#1 at velocity "a+1," it is then exposed to additional rotating coil faces that must be less angled to accommodate the increased velocity imparted by HF#1. The result is that energy is increasingly imparted to an initial volume of fluid as it moves rearward in the ribbon drive pumping tube at an ever increasing axial velocity.

Since water is contained within the cylinder of a ribbon drive pumping system, its velocity through the cylinder (rotating at a constant R.P.M.) should progressively increase, with the volume exiting the rear being limited by the net water intake in the forward half, and the diameter of the exit outlet. Negative internal pressures found to be present (experimentally) in the forward half tend to support the theory of increasing velocity along the ribbon drive unit interior.

Coil frequencies and axial lengths can be optimized. Coils, divided into separate sections and arranged in series, can also be rotated at different RPM's (by separate drive means) to achieve optimal output.

The containment tube could be spun or rotated by any of a number of means of power. Power could be transmitted to the containment tube of the pumping apparatus from the means of power by the use of gears, pulleys, or any of a variety of combinations of techniques including magnetic attraction/repulsion methods. When pumping cryogens, a drive and bearing system with superconducting magnets could be used which takes advantage of the cryogen temperatures.

The pumping apparatus could be employed in a variety of sizes based on the particular space or configuration restrictions of the area(s) in which it would be employed. The pumping apparatus could also be employed in a number of teaming arrangements in pairs, threes, fours, and so forth as well as in parallel or series based on the specific requirements of the hydropower generation installation or other installation requiring movement of large volumes of fluid. The invention is both scalable and modular in its variety of possible configurations.

The employment of such an effective and energy-efficient means of pumping would allow hydropower generation facilities to pump water from a variety of sources to reservoirs located at higher elevations thereby imparting energy by virtue of creating a waterfall situation and providing a steady and reliable source of energy in areas previously deemed unsuitable for hydropower generation efforts because of insufficient water depth, insufficient water volume, and/or insufficient speed of water flow. The use of such a reservoir(s) reduces and, in some cases eliminates, the requirement for the large and costly dam and large flooded areas which plague, but are a requirement for operation of, current hydropower generation facilities. This flexibility would allow energy efficient pumping of water in support of hydropower generation efforts thereby allowing such hydropower generation efforts to be employed in areas previously deemed unsuitable for such activities.

Figure 2:
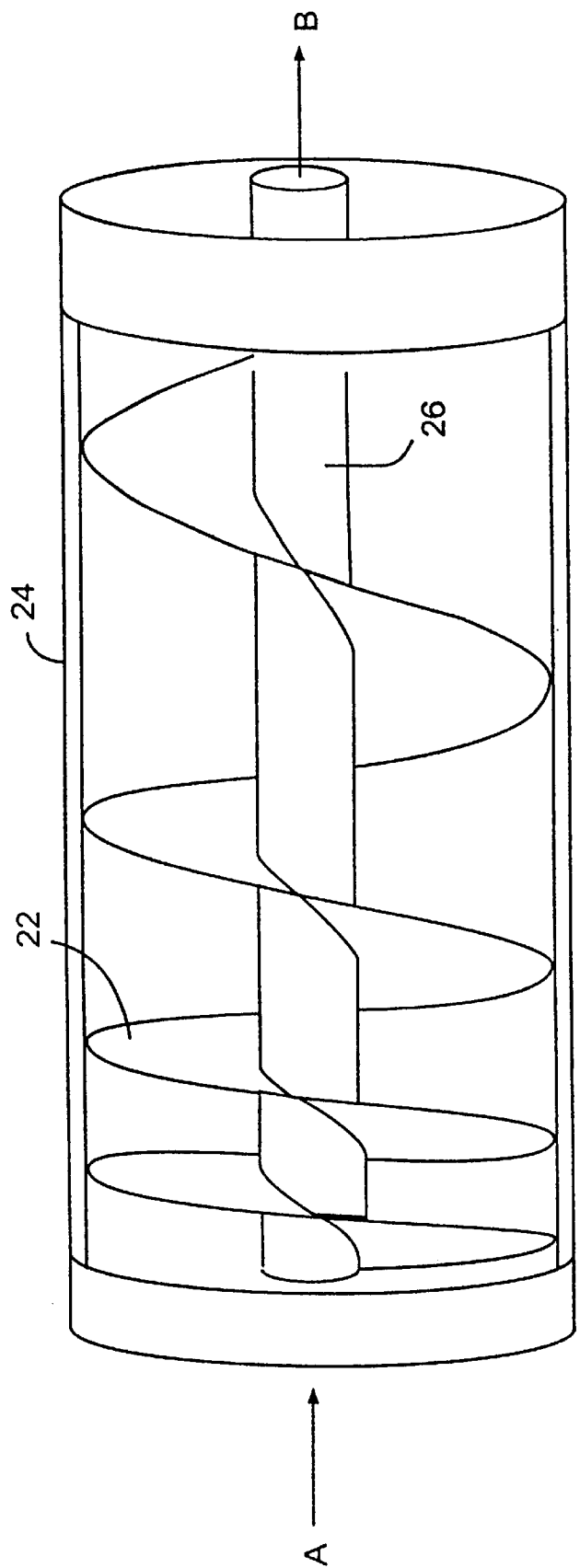
FIG. 2 illustrates the central design of the pump apparatus.

FIG. 2 illustrates an alternative embodiment wherein the coils of the ribbon vane 22 are attached to a central shaft 26 and the containment tube 24 remains stationary. Rotation of ribbon vane 22 produces similar pumping effects, but without the same level of shear force reduction found in the peripheral design described above. The central shaft design and stationary containment tube may utilize slip stream channels or a hollow central axle core perforated for additional water passage, either of which extra water sources may supply additional water to internal areas having significant negative pressure.

The curved ribbon-like vane may be made of metal, plastic, composite or other sturdy material. The frequency of the ribbon-like vane may be fixed (static) or variable (dynamic or adjustable). It can be made variable by segmenting the ribbon into a contiguous length of hinged, interlocking, or overlapping blades, which are movable by reason of linkages or sliding splines (or other means to those skilled in the art) along the length of the ribbon band, or by linear elongation or contraction. The latter can be achieved by centrifugal effect, magnetic or hydraulic means, or other variable steppage. This can be designed where the outer edge of the ribbon-like vane is attached, in the peripheral design, to outer rings or to a cylindrical or conical tube, located within the overall ribbon drive unit. In the central design, the innermost central edge of the ribbon-like vane is attached to the central axle, which can include tubular sections that slide longitudinally or include slots within which the innermost edge attachment of the ribbon-like vane can be adjusted to slide, or by other methods. The material of the ribbon-like vane can have limited but finite flexibility/extensibility, to permit adjustment as the pumping flow through the ribbon drive comes up to speed.

In the circumstance of utilizing the centrifugal effect generated by the spinning ribbon drive, the centrifugal force upon the ribbon-like band itself while rotating will impart energy to the band, which would tend to uncoil. This tendency could be utilized if there were some limited flexibility and adjustability designed herein by virtue of choice of materials and method of attachment, as indicated in the preceding paragraph. An increasing centrifugal force from increased rate of rotation of the ribbon drive upon the ribbon-like band would tend to cause the curve of the band to uncoil. That is, the curve frequency would become less acute and more gradual with fewer coils per unit length; the helix angle of the curve would change from close to vertical to more close to the horizontal as defined by the central axis, thereby allowing water to flow through even more rapidly while the centrifugally reconfigured ribbon drive turns at a constant speed.

Analogously, for the effect of centrifugal force upon a coil, imagine two persons spinning one rope between them with each holding one end, versus one person alone holding one end of a rope and spinning it. The unattached, far-end of the rope will spin outwardly into a more gradual arc as it unwinds.

Figure 3:
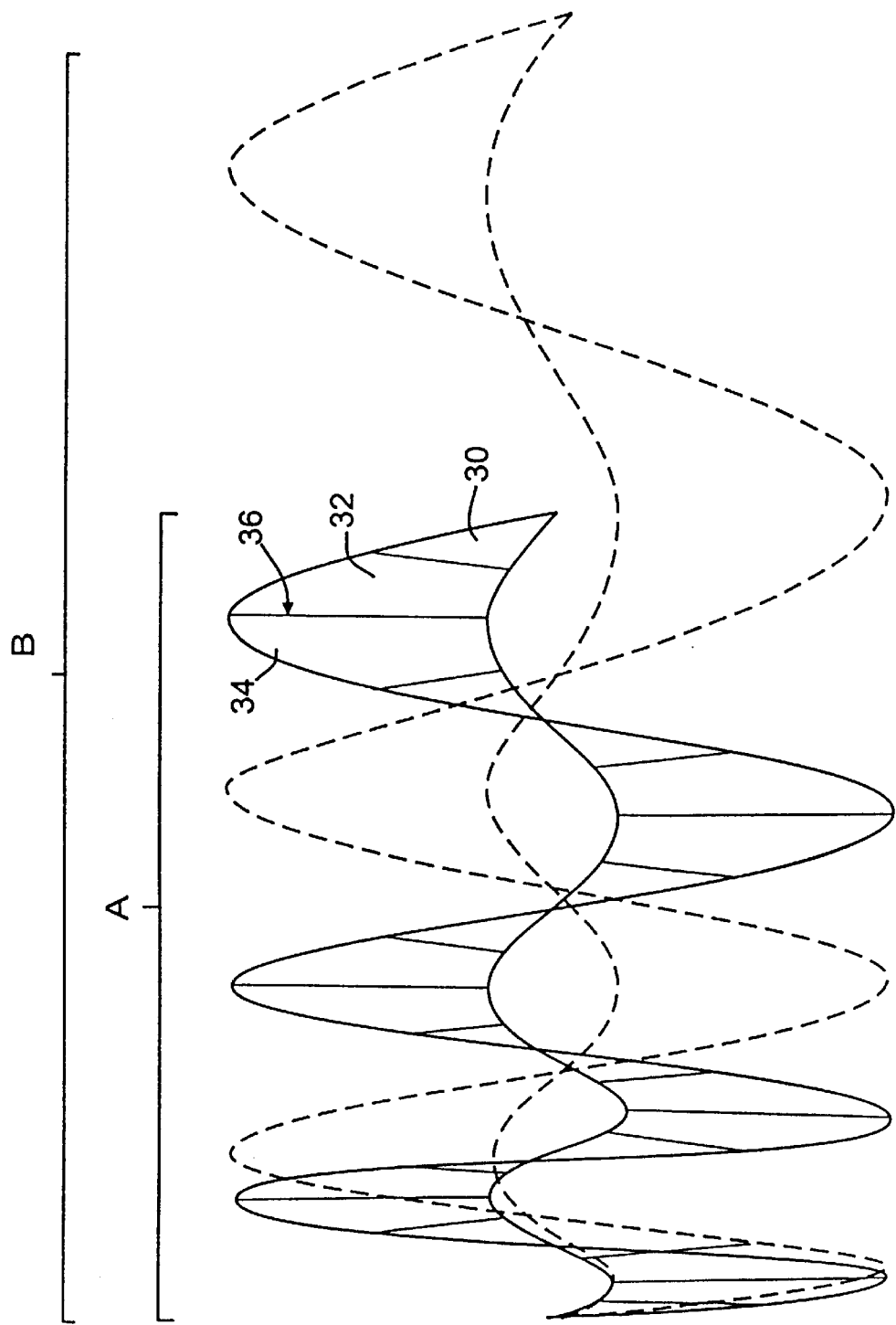
FIG. 3 illustrates an adjustable ribbon embodiment of the present invention.

Referring to FIG. 3, a variable or adjustable implementation of the ribbon-type band or vane for the ribbon drive pumping system of the present invention is illustrated. An adjustable ribbon, in the form of a series of blades 30, 32, 34, as it would extend through a containment tube (not shown) is illustrated. This band could be used in either the peripheral design, by having an axially adjustable peripheral attachment means for the band, or used in the central design, by having an axially adjustable attachment means on the central axle. These blades form the vane and proceed in a coil-like design, with the frequency of the coils decreasing along the length of the axis in the direction of the water flow. The blades can be hinged, interlocking, or overlapping by any suitable means, as shown at 36, to form a unitary-type ribbon. The ribbon starts at a first length A and can be adjusted to a second length B, as shown by the dashed lines, thereby having effectively lower frequency coils. This feature would allow greater pumping at lower RPM's desired for cavitation reduction and, also, the fine-tuning of the ribbon to prevent cavitation.

Figure 4:
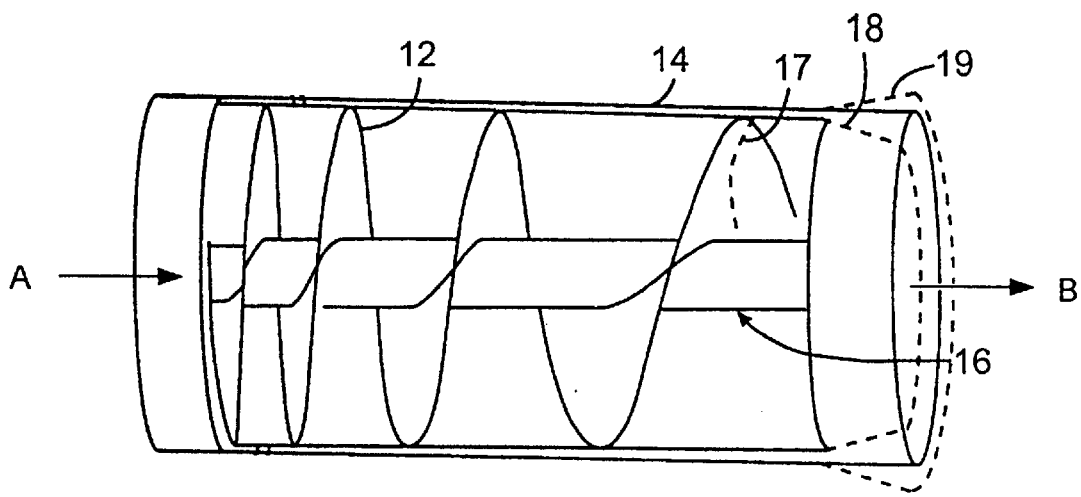
FIG. 4 illustrates possible variable diameter sections.
Figure 5:
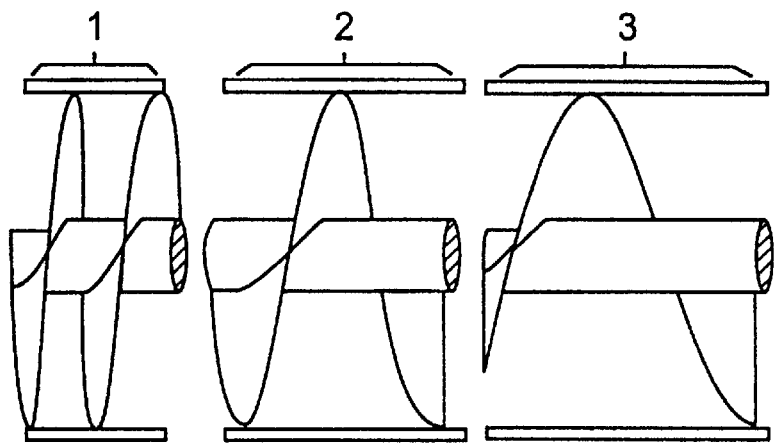
FIGS. 5 and 6 illustrate respective serial and parallel plural vane embodiments.
Figure 6:
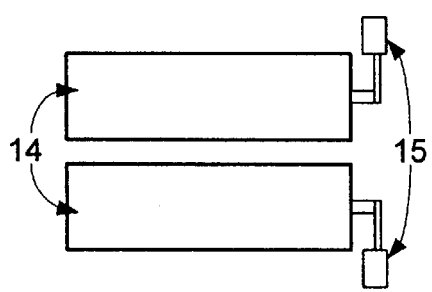
Figure 7:
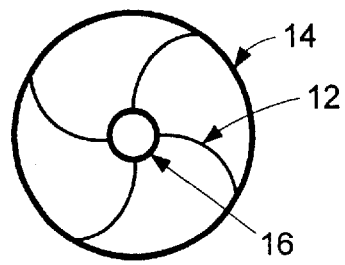
FIG. 7 illustrates a concentric plural vane embodiment.

Various modifications can be made without departing from the scope of the present invention. For example, FIG. 4 illustrates possible variable diameter sections 18 and 19 at the unobstructed outlet of tube 14; FIG. 5 illustrates plural sections 1, 2, and 3 for axially and serially aligning plural vanes; FIG. 6 illustrates parallel tubes 14 and individual drive means 15 for aligning vanes in a parallel manner; and FIG. 7 illustrates plural vanes 12 equally spaced about a shaft 16.

Although the ribbon is illustrated in FIGS. 2, 4, 5, and 7 as extending to tube, one of ordinary skill in the art will understand that a small clearance must exist between the ribbon and tube so as to prevent interference.

The present invention can also provide peak shaving for existing power systems by pumping water to reservoirs during low demand periods to be used for hydropower generation during peak demand periods.

The aspect of increasing the velocity of the water as well as the scalability and modular nature of the present invention allow it to meet the objective of creating a pumping apparatus for a hydropower generation system which involves significantly decreased outlays of capital for facilities construction required for current technologies to operate.

The aspect of increasing the velocity of the water as well as the scalability and modular nature of the present invention allow it to meet the objective of creating a pumping apparatus for a hydropower generation that requires a significantly less volume of water thereby resulting in decreased flooding and rendering unusable the large areas of land needed to contain the vast amounts of water required for current technologies to operate.

The aspect of increasing the velocity of the water as well as the scalability and modular nature of the present invention allow it to meet the objective of creating a pumping apparatus that will allow a hydropower generation system to function in areas where water depth, water volume, and/or speed of water flow are insufficient to support current technology hydropower generation.

Although the present pumping apparatus and method has been disclosed with respect to use with hydropower generation, this is not meant as a limitation. Indeed, the disclosed ribbon-driven pump has utility for transferring any liquid. The central opening or core of the present peripheral design ribbon drive allows for a certain amount of pressure equalization that helps to suppress cavitation. Additionally, the free edge of the ribbon is near the rotational axis so as to travel at the lowest velocity, again helping to suppress cavitation and lower shear forces exerted on items suspended within the fluid flow. Therefore it is contemplated that the peripheral design ribbon drive pumping system is also suited for applications where cavitation and the noise associated with cavitation would be undesirable, such as in military submarines (e.g., for reactor coolant, etc.), artificial hearts, and the pumping of low vapor pressure liquids like refrigerants and cryogens.

Also, with respect to artificial hearts, the present system has the advantage of lacking any intermeshing elements within the blood flow so as not to damage cells.

I claim:

1. A pumping apparatus for liquids comprising:

a tube having an inner surface, an intake at a first end, and an outlet at a second end;

at least one ribbon having a peripheral edge mounted to said inner surface of said tube, said ribbon being located entirely within the tube in a longitudinal direction, and being formed of coils extending in a helical manner from the first end to the second end of the tube, wherein a frequency of coils per unit length of tube decreases from the first end to the second end of the tube; and drive means for rotating said tube and ribbon so as to pump liquid from said first end to said second end.

2. The pumping apparatus for liquids of claim 1, wherein the ribbon extends radially inward from the tube a length less than a radius of the tube to form a central, axial opening in the ribbon.

3. The pumping apparatus for liquids of claim 1, comprising plural axially connected sections, each section having a separate tube and ribbon.

4. The pumping apparatus for liquids of claim 3, further comprising each section having a separate drive means.

5. The pumping apparatus for liquids of claim 1, comprising plural ribbons mounted within said tube.

6. The pumping apparatus for liquids of claim 1, comprising plural, parallel units, each unit having a separate ribbon.

7. The pumping apparatus for liquids of claim 1, wherein said ribbon is cupped to have a concave curvature in a direction facing the outlet.

8. The pumping apparatus for liquids of claim 1, wherein the ribbon is formed of rigid material selected from the group consisting of metal, composite materials, plastic polymer, and ceramic.

9. The pumping apparatus for liquids of claim 1, wherein at least a portion of the tube has a variable diameter.

10. The pumping apparatus for liquids of claim 1, further comprising a plurality of ribbons equally spaced on the interior circumference of the tube.

11. The pumping apparatus for liquids of claim 1, further comprising means to adjust the length and coil frequency of the ribbon.

12. A pumping method for liquids comprising:

providing a tube having an inner wall, an intake at a first end, and an outlet at a second end;

rotating said tube and at least one ribbon having a peripheral edge mounted to said inner surface of said tube so as to:

collect liquid at the first end;

increase an axial component of velocity of the liquid with the rotating ribbon; and eject liquid from the second end to pump said liquid, wherein said ribbon is located entirely within the tube in a longitudinal direction, and is formed of coils extending in a helical manner from the first end to the second end of the tube, and wherein a frequency of coils per unit length of tube decreases from the first end to the second end of the tube.

13. The pumping method for liquids of claim 12, wherein the ribbon extends radially inward from the tube a length less than a radius of the tube to form a central, axial opening in the ribbon.

14. The pumping method for liquids of claim 12, comprising providing plural axially connected sections, each section having a separate tube and ribbon.

15. The pumping method for liquids of claim 14, further comprising each section having a separate drive means.

16. The pumping method for liquids of claim 12, comprising providing plural, parallel units, each unit having a separate tube and ribbon.

17. The pumping method for liquids of claim 12, further comprising rotating a plurality of ribbons equally spaced on the interior circumference of the tube.

18. The pumping method for liquids of claim 12, further comprising moving water to a raised reservoir during periods of low power demand; and releasing water in said reservoir to produce hydropower during periods of high power demand.

19. A pumping apparatus for liquids comprising:

a tube having a substantially constant diameter intake at a first end and an outlet at a second end;

an axial shaft inside said tube;

at least one ribbon having an inner edge mounted to said shaft, said ribbon being formed of coils extending in a helical manner from the first end to the second end of the tube, wherein a frequency of coils per unit length of tube decreases from the first end to the second end of the tube; and drive means for rotating said shaft and ribbon so as to pump liquid from said first end to said second end.

20. A pumping method for liquids comprising:

providing a tube having a substantially constant diameter intake at a first end, and an outlet at a second end;

rotating an axial shaft within said tube and at least one ribbon having an inner edge mounted to said shaft so as to:

collect liquid at the first end;

increase an axial component of velocity of the liquid with the rotating ribbon; and eject liquid from the second end to pump said liquid, wherein said ribbon is formed of coils extending in a helical manner from the first end to the second end of the tube, and wherein a frequency of coils per unit length of tube decreases from the first end to the second end of the tube.

* * * * *

UNITED STATES PATENT AND TRADEMARK OFFICE
CERTIFICATE OF CORRECTION

PATENT NO.     : 6,357,998 B1
DATED          : March 19, 2002
INVENTOR(S)    : Jonathan B. Rosefsky It is certified that error appears in the above-identified patent and that said Letters Patent is hereby corrected as shown below:

<u>Column 5,</u>
Line 28, "thought of" should be followed by the word -- as --; and
Line 29, "purposes" should be followed by -- ) --.

Signed and Sealed this

Twenty-fifth Day of June, 2002

*Attest:*

*Attesting Officer*

JAMES E. ROGAN
*Director of the United States Patent and Trademark Office*